United States Patent [19]
Esch et al.

[11] 3,778,880
[45] Dec. 18, 1973

[54] TOOLING POSITIONING DRIVE SYSTEM FOR AUTOMATIC GAGING AND ASSEMBLY MACHINES

[75] Inventors: Robert E. Esch, Bloomfield Hills, Mich.; William C. Arnold, Dayton, Ohio; Billy K. Skelton, Dayton, Ohio; Michael D. Saxon, Dayton, Ohio; Jerome A. Murphy, Kettering, Ohio; Roy S. Saques, Englewood, Ohio

[73] Assignee: The Bendix Corporation, Southfield, Mich.

[22] Filed: Sept. 25, 1972

[21] Appl. No.: 292,049

[52] U.S. Cl. ............................ 29/208 C, 29/200 A
[51] Int. Cl. ...................... B23p 19/04, B23p 19/00
[58] Field of Search ................... 29/208 D, 208 C, 29/208 R, 200 A, 200 P

[56] References Cited
UNITED STATES PATENTS
3,648,346 3/1972 Graham et al. ................ 29/208 C X

*Primary Examiner*—Thomas H. Eager
*Attorney*—John R. Benefiel et al.

[57] ABSTRACT

A drive system for positioning the tooling of linear transfer automatic gaging and/or assembly machines is disclosed which allows the use of standardized modular components for greatly varying machine applications. The drive system includes a power take-off shaft extending along the machine workpiece transfer system and a series of motion mechanisms located at each tooling station, each motion mechanism including a rotary cam driven by a flexible drive element in turn driven by the power take-off shaft, a pivoted lever oscillated by the rotary cam, and a tooling mounting slide translated by oscillation of the pivoted lever. Variations in the position of the tooling relative the power take-off shaft and the transfer system required for various applications are taken up in the flexible drive element to allow the use of standardized cam-lever-slide modules for the varying machine configurations.

10 Claims, 12 Drawing Figures

TOOLING POSITIONING DRIVE SYSTEM FOR AUTOMATIC GAGING AND ASSEMBLY MACHINES

BACKGROUND OF THE INVENTION

1. Field of the Invention

This invention concerns gaging or assembly machines and more particularly such machines in which workpieces are automatically and linearly transferred through a series of work stations whereat orienting, locating, gaging, assembly, and other related operations are performed thereon by means of mechanical motion mechanisms equipped with the appropriate tooling.

2. Description of the Prior Art

Linear transfer automatic gaging and assembly systems have traditionally required a great deal of engineering and design effort for each particular application, and a large proportion of the mechanical parts included therein were fabricated on an individual basis, unique to the particular job at hand; which in turn rendered such systems costly to produce and also necessarily involved long lead times from orders to delivery.

In mechanically operated systems (as opposed to hydraulic or air cylinders systems) this state of affairs was due in large part to the drive system utilized to position the tooling which performed the various functions at each station. This system usually included a camshaft extending down the length of the linear transfer line, carrying various rotary cams which in turn operated linkages driving tooling mounts carrying the tooling, to perform the various gaging and other necessary functions.

However, since the spacing relationship of the linkage with respect to the transfer line varied vastly for each particular machine and for stations within a given machine, and because of the infinite variety of tooling and workpiece configurations, these linkages were of necessity designed and built on an individual basis.

Accordingly, it is an object of the present invention to provide a tooling positioning drive system for linear transfer automatic gaging machines which allows the use of standardized motion mechanisms, modules and other components to perform the various machine functions.

SUMMARY OF THE INVENTION

This and other objects which will become apparent upon a reading of the following specification and claims are accomplished by a drive system including a common power take-off shaft extending along the transfer line with a plurality of flexible drive elements driven thereby and in turn driving one of a series of standard motion mechanisms each including a rotary cam, a pivoted lever oscillated thereby, and a translating tooling mounting slide. The variation in position of the motion mechanisms relative to the transfer line is taken up by variations in the length of the flexible drive elements driven by the power take-off shaft to thereby allow the standardization of the motion mechanisms.

DETAILED DESCRIPTION

In the following detailed description certain specific terminology will be utilized for the sake of clarity and a specific embodiment will be described in order to provide a complete understanding of the invention, but it is to be understood that the invention is not so limited and may be practiced in a variety of forms and embodiments.

Figure 1:
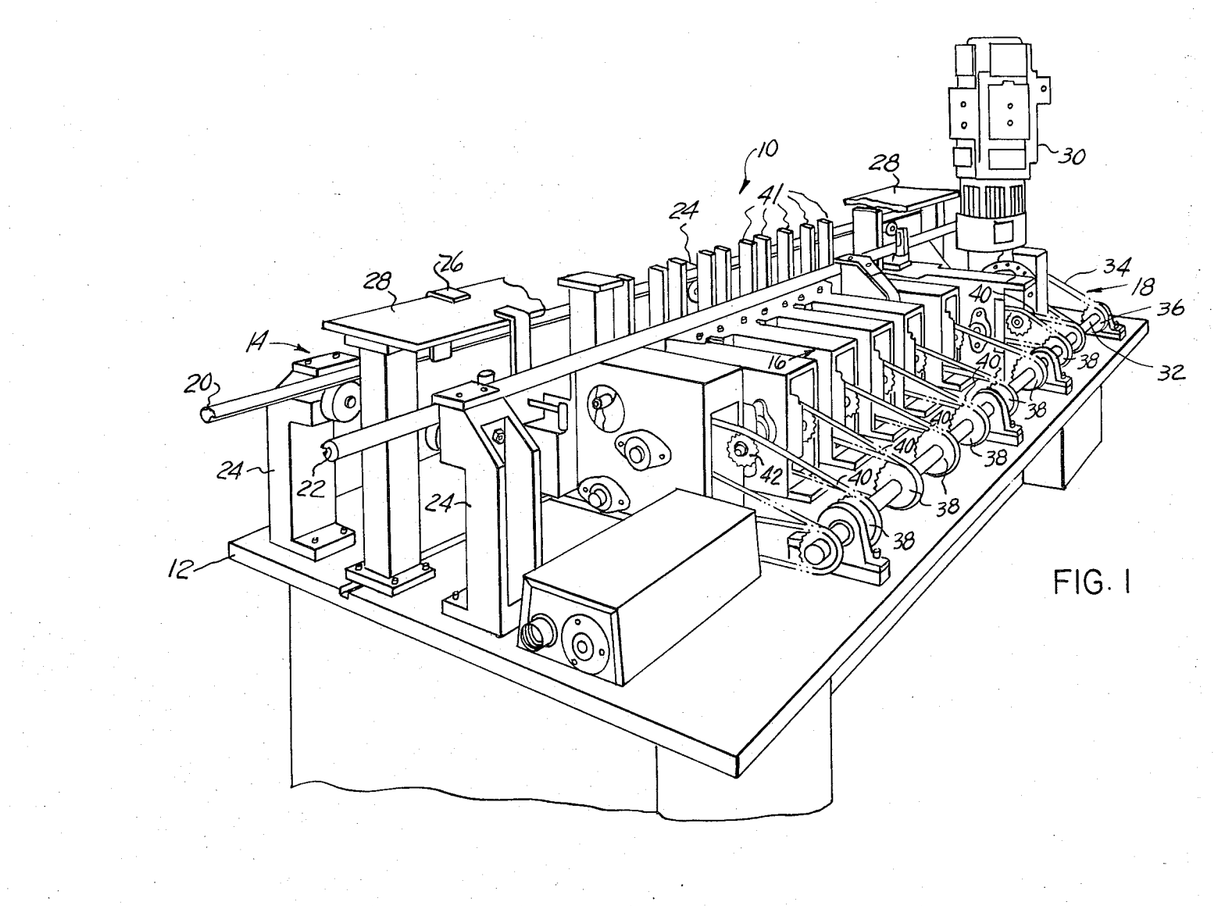
FIG. 1 is a perspective view of a partially assembled linear transfer automatic gaging machine utilizing the drive system of the present invention.

Referring to FIG. 1, a partially assembled automatic gaging machine 10 is shown, less the tooling, electronics cabinetry, feed and eject chutes, and mechanisms and other structure not pertinent to the present invention for the sake of clarity in describing the tooling positioning drive system therefor.

The automatic gaging machine 10 includes a base 12 upon which are mounted the linear transfer system 14 for moving workpieces through the machine, and a series of motion mechanism means 16 together with a rotary power system 18 therefor for positioning the tooling which performs the various operations such as orienting, locating, gaging, assembly, etc.

The linear transfer system 14 includes a pair of transfer rods 20, 22 mounted in a series of roller supports 24 which allow reciprocation thereof by a grooved, axial cam (described infra). The transfer rods 20, 22 are also rotated about their axes during their reciprocation by one of the motion mechanism means 16 to be described herein, so that a series of part capturing fingers 26 secured to transfer rods 20, 22 (two of which are shown in FIG. 1) are adapted to be rotated so that the workpieces positioned on a transfer line plate 28 (portions shown in FIG. 1) are captured therebetween during the advancing motion of the transfer rods 20, 22 and rotated out of engagement therewith during retraction, of the transfer rods 20, 22, to thus advance workpieces along the transfer line by incremental linear movements.

In connection with this, it is noted that part capturing fingers 26 are located all along the length of both transfer rods 20, 22 at intervals equal to the particular increment of transfer motion imparted thereto by the axial cam, but which are not shown for the purposes of clarity.

The rotary drive system 18 includes a suitable drive means 30 adapted to rotate a power take-off shaft 32 extending along the transfer line and rotatably mounted on the base 12 by means of a drive chain 34 rotating a sprocket 36 fixed to the power take-off shaft 32.

Each motion mechanism means 16 is drivingly connected to the power take-off shaft 32 by means of a sprocket 38 affixed to the power take-off shaft 32 drivingly engaging a respective flexible drive element shown as a link chain 40 which extends into the respective motion mechanism means 16 and passes over an idler sprocket 42 and thence to drive a rotary cam means described below which is supported within each motion mechanism means 16.

In the machine 10 shown n FIG. 1, the gaging and/or other operations are performed by vertical lift motion, and for this purpose tooling support fixturing 41 is adapted to be vertically reciprocated, so that the tooling (not shown) carries out the various functions such as gaging, weighing, etc.

FIGS. 2-11 show details of standardized motion mechanisms suitable for use in gaging and/or assembly machines according to the present invention together with typical gaging tooling set ups therefor.

Figure 2:
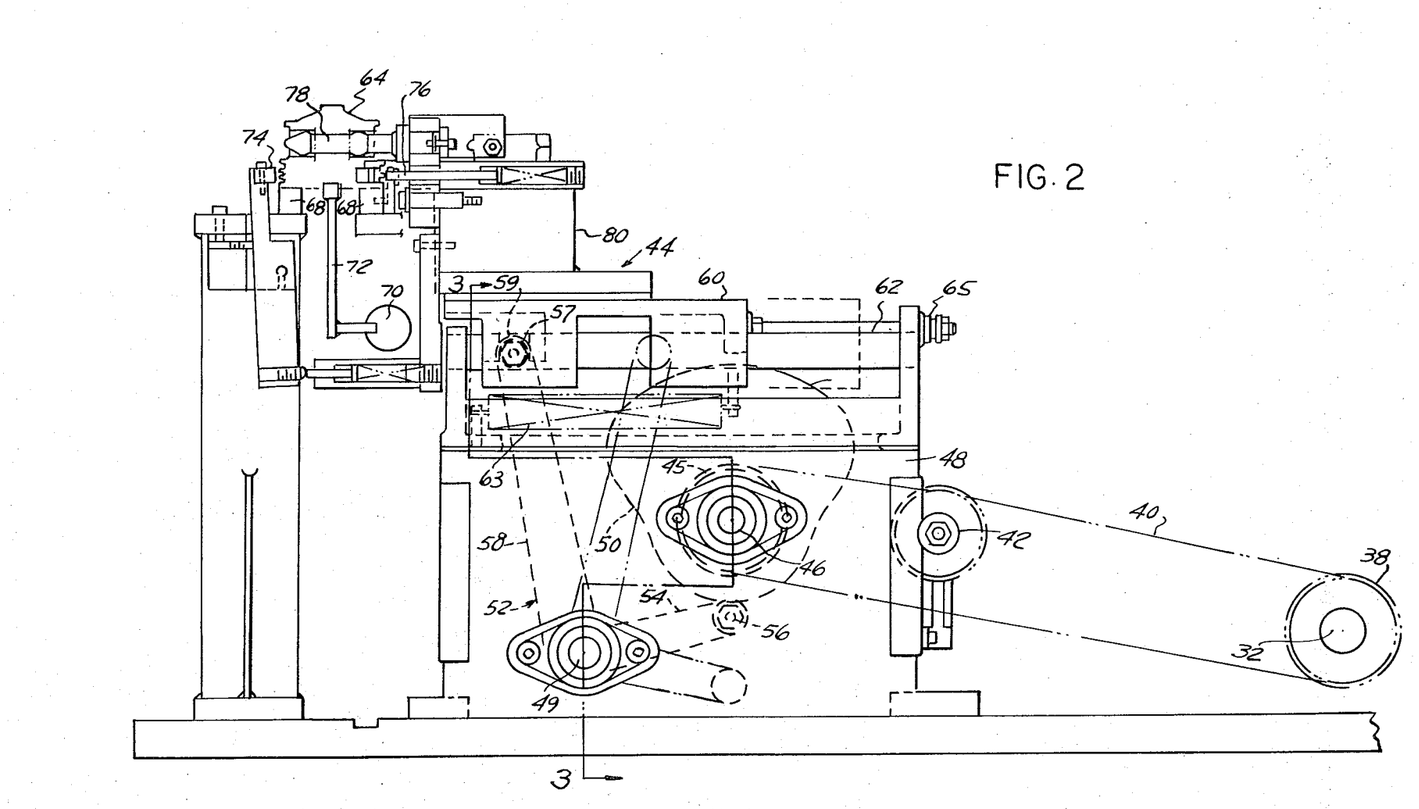
FIG. 2 is a side elevational view of a horizontal slide mechanism according to the present invention together with a typical tooling therefor and the driving relationship with the power take-off shaft according to the present invention.
Figure 3:
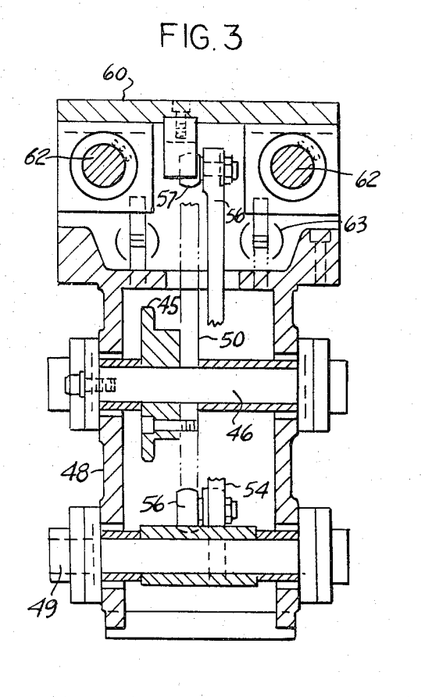
FIG. 3 is a view of the section taken along line 3—3 in FIG. 2.
Figure 4:
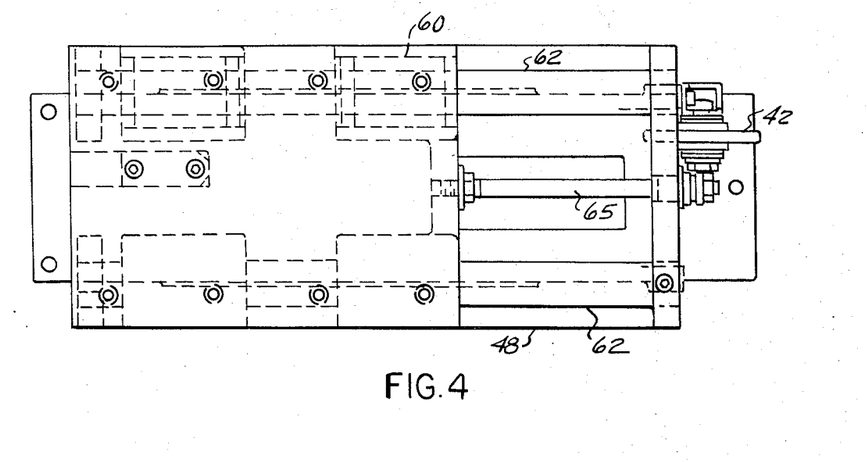
FIG. 4 is a plan view of the horizontal slide mechanism shown in FIG. 2.

FIG. 2 depicts a horizontal motion mechanism 44, which includes rotary cam means consisting of a cam shaft 46 rotatably mounted in a housing 48, a sprocket 45 carried thereon, and a rotary cam plate 50 fixed to the sprocket 45 so as to be rotated by the chain 40.

Rotatably supported in the housing 48 by a pivot shaft 49 is a pivoted lever 52 having one arm 54 terminating in a cam follower 56 engaging the periphery of the rotary cam 50 so as to cause oscillation of the pivoted lever 52 as the rotary cam plate 50 is rotated.

The other arm 58 of the pivoted lever 52 carries a cam follower 57 engaged with a drive slot 59 carried by tooling mounting slide member 60 slidably mounted on the housing 48 by means of slide rods 62 affixed thereto, and spring biased to the position shown in FIG. 2 by a pair of tension springs 63 connected to the tooling mounting slide member 60 and housing 48, so that the pivoted lever 52 constitutes means interconnecting the tooling mounting slide member and the rotary cam means to cause oscillation of the pivoted lever 52 results in reciprocation of the tooling mounting slide member 60 to provide a horizontal motion.

An adjustable travel limit stop 65 is also included to provide very accurate positioning of the tooling mounting slide member 60 in its extended position as shown.

Mounted upon the tooling mounting slide member 60 by means of suitable fixturing is a typical tooling arrangement, shown in FIG. 2 as piston orientation checking tooling, in which a piston 64, which is being advanced on a pair of rails 68 by means of a transfer bar 70 and finger 72 is checked for proper orientation for further gaging and/or assembly steps such as the insertion of a piston pin. This check is carried out while the piston 64 is held by a pair of grippers 74 and 76 which are moved together by horizontal motion of the tooling mounting slide member 60 by means of fixturing 80 secured thereto to position, while at the same time a locating spindle 78 is inserted through the piston pin opening to determine the orientation of the axis thereof with respect to a centerline by the same movement of the tooling mounting slide member 60. This determination is accomplished by a floating mounting of the spindle 78 which moves in one direction with one orientation of the piston 64 and in another direction with the other possible orientation, one of which is the correct orientation.

By suitable limit switch controls, a subsequent orientation station (not shown) is either activated or not activated by the results of the orientation check.

Inasmuch as such tooling arrangements are in themselves known in the art and do not comprise the present invention, a detailed description is not herein included.

Figure 5:
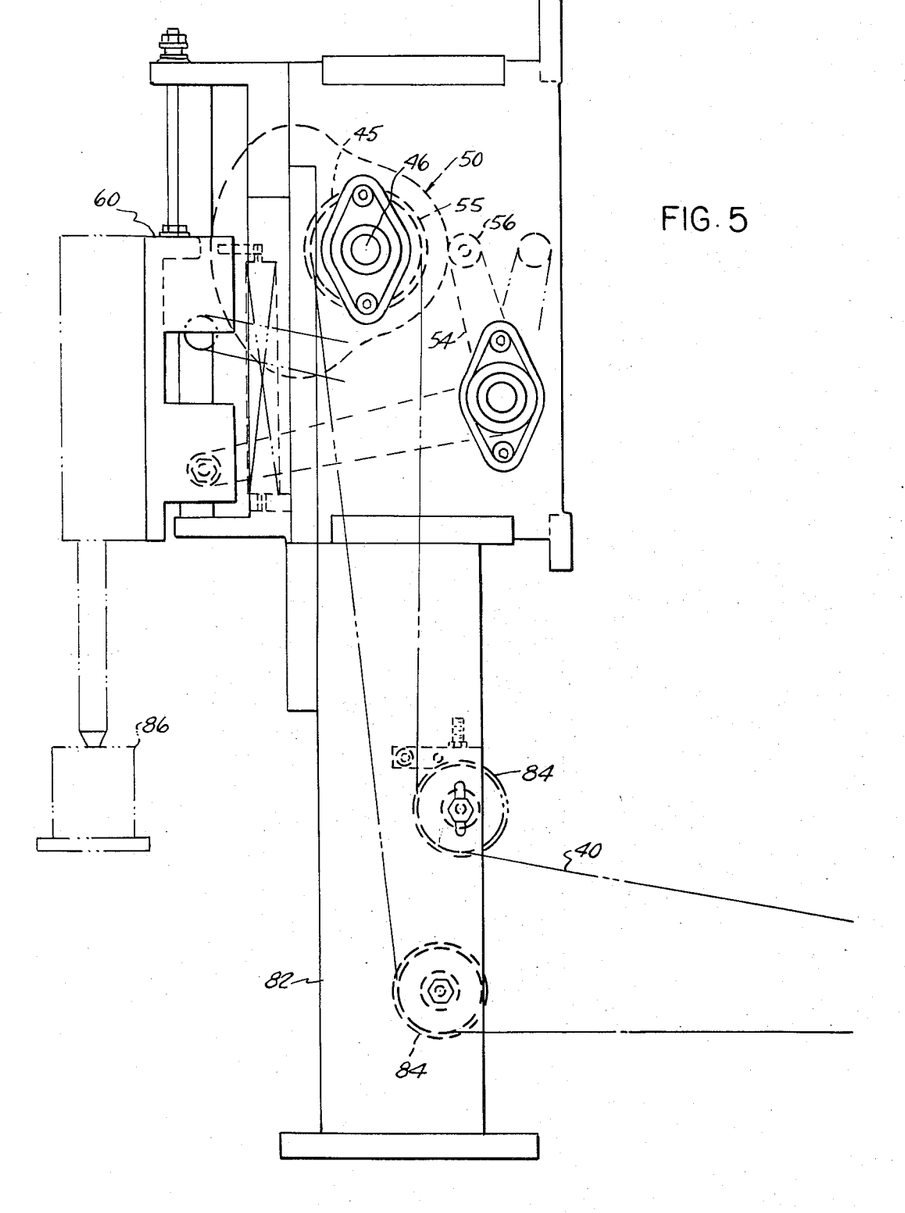
FIG. 5 is a side elevational view of the horizontal slide mechanism shown in FIGS. 2–4 mounted for vertical motion from above.

FIG. 5 shows the same horizontal motion mechanism 44 shown in FIG. 2 but mounted to produce vertical motion from above the transfer line. In this arrangement, a vertical mounting fixture 82 is utilized to secure the horizontal motion mechanism so that the tooling mounting slide member 60 reciprocates vertically. In this case the chain 40 is routed via idlers 84 to the sprocket 45 and back via idlers 84, both mounted on the fixture 82.

Thus, the tooling mounting slide member 60 is adapted to be vertically reciprocated above the workpieces 86 to carry out various operations from above as for example gaging of the upper surface as shown.

Figure 6:
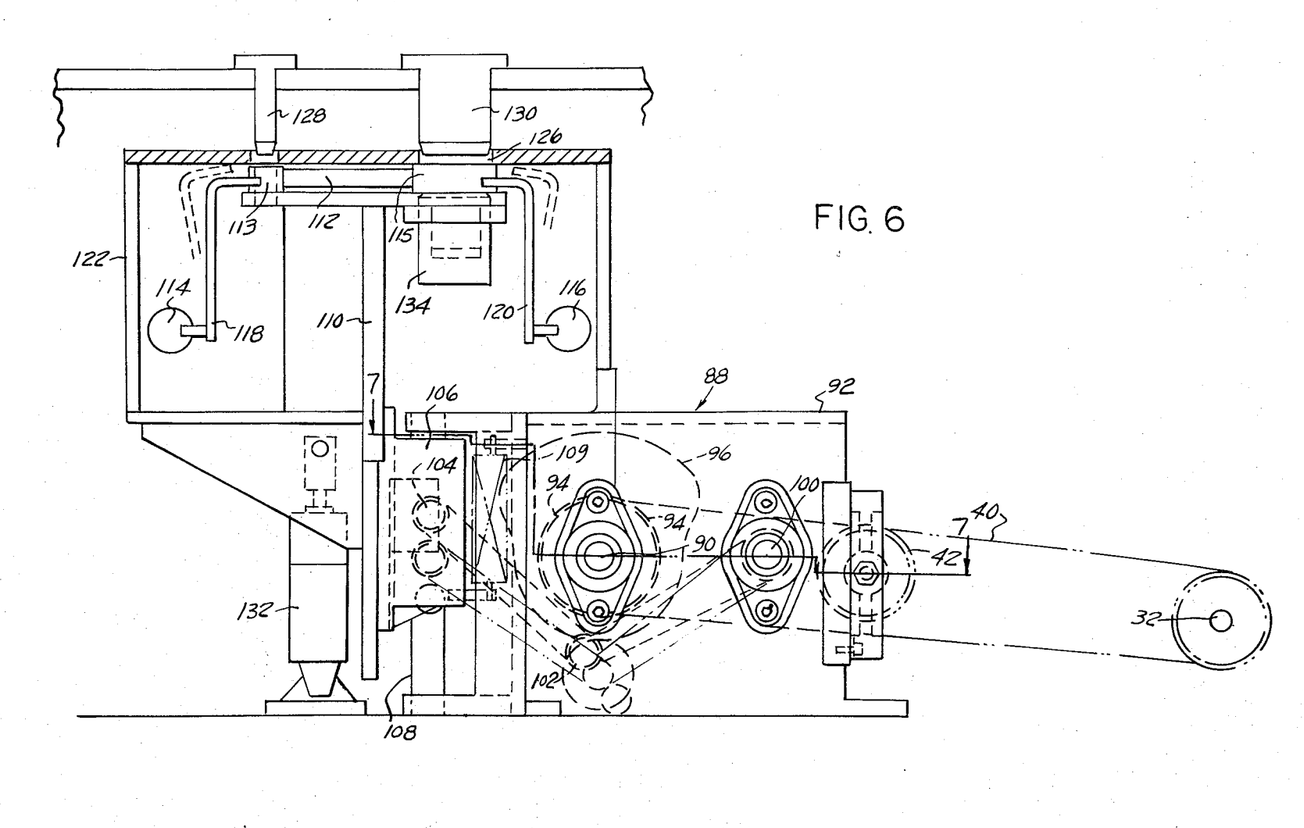
FIG. 6 is a side elevational view of a lift slide mechanism according to the present invention together with a typical tooling therefor and the driving relationsip with the power take-off shaft according to the present invention.
Figure 7:
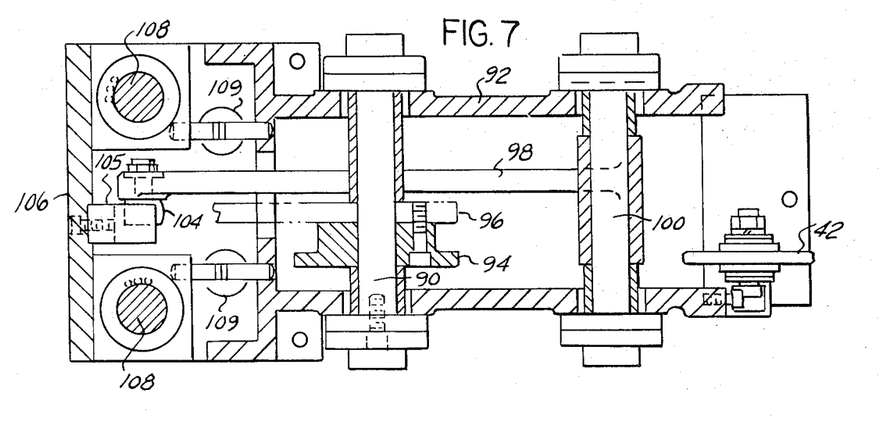
FIG. 7 is a view of the section taken along line 7—7 in FIG. 6.
Figure 8:
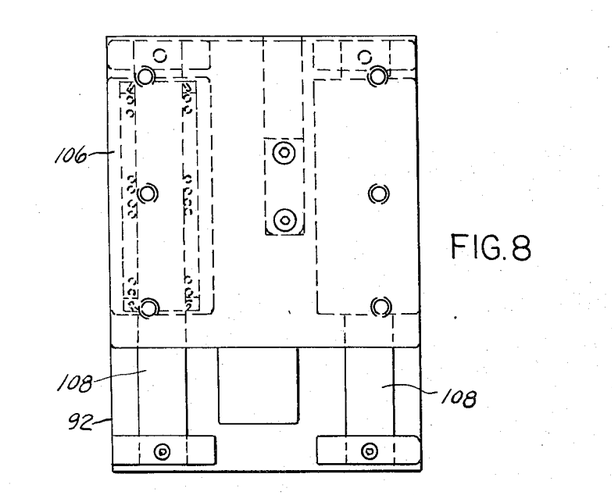
FIG. 8 is a front elevational view of the lift slide mechanism shown in FIG. 6.

Referring to FIGS. 6-8 a lift motion mechanism 88 is shown which includes rotary cam means comprising a camshaft 90 rotatably mounted in a housing 92 and carrying a sprocket 94 and rotary cam plate 96 affixed thereto which is drivingly connected to the power take-off shaft 32 and driven by a chain 40 engaging the sprocket 94.

A pivoted lever 98 is also rotatably mounted by a pivot shaft 100 in the housing 92 and carries a cam follower 102 at a point along its length at which the lever 98 is angled so as to be oscillated about the axis of the pivot shaft 100.

The opposite end of pivoted lever 90 carries a roller 104 which engages a slotted drive element 105 connected to a tooling mounting slide member 106 slidably mounted on rods 108 and biased upwardly by a pair of springs 109 to drivingly connect the rotary cam means and tooling mounting sliding member 106 so as to cause vertical motion thereof by oscillation of the pivoted lever 98.

An example of a typical tooling application for this motion mechansim 88 is shown in FIG. 6 and includes a left platform 110 fixed to the tooling mounting slide 106 and adapted to receive workpieces 112 (shown as an engine connecting rod having openings 113 and 115 at either end) being moved down the transfer plate by a pair of oscillating and reciprocating transfer bars 114 and 116 engaging the workpieces 112 by means of fingers 118 and 120.

Upon upward movement of the lift platform 110 by the reciprocation of the tooling mounting slide 106, the workpiece 112 engages and lifts a moveable stripper housing 122 having openings 124, 126 aligned with the openings 113 and 115 of the workpiece 112. Both then move together upwardly so that gaging spindles 128 and 130 pass through the openings 113, 115, 124, and 126 and gage the size thereof.

Upon downward movement, the weight of the moveable stripper housing 122 strips the workpiece from the gaging spindles 128 and 130 and as it reaches the limit of its downward travel shown in FIG. 6, the workpiece 112 is again positioned on the platform member 110, as shown in FIG. 6, free of engagement with either moveable stripper housing 122 or gaging spindles 128 and 130. The platform member 110 continues downwardly until the workpiece 112 is again positioned for engagement with gripper fingers 118, 120 for advancement down the line.

Air springs 132 and 134 are used to cushion the downward movement of the moveable stripper housing 122 and the platform 110.

Figure 9:
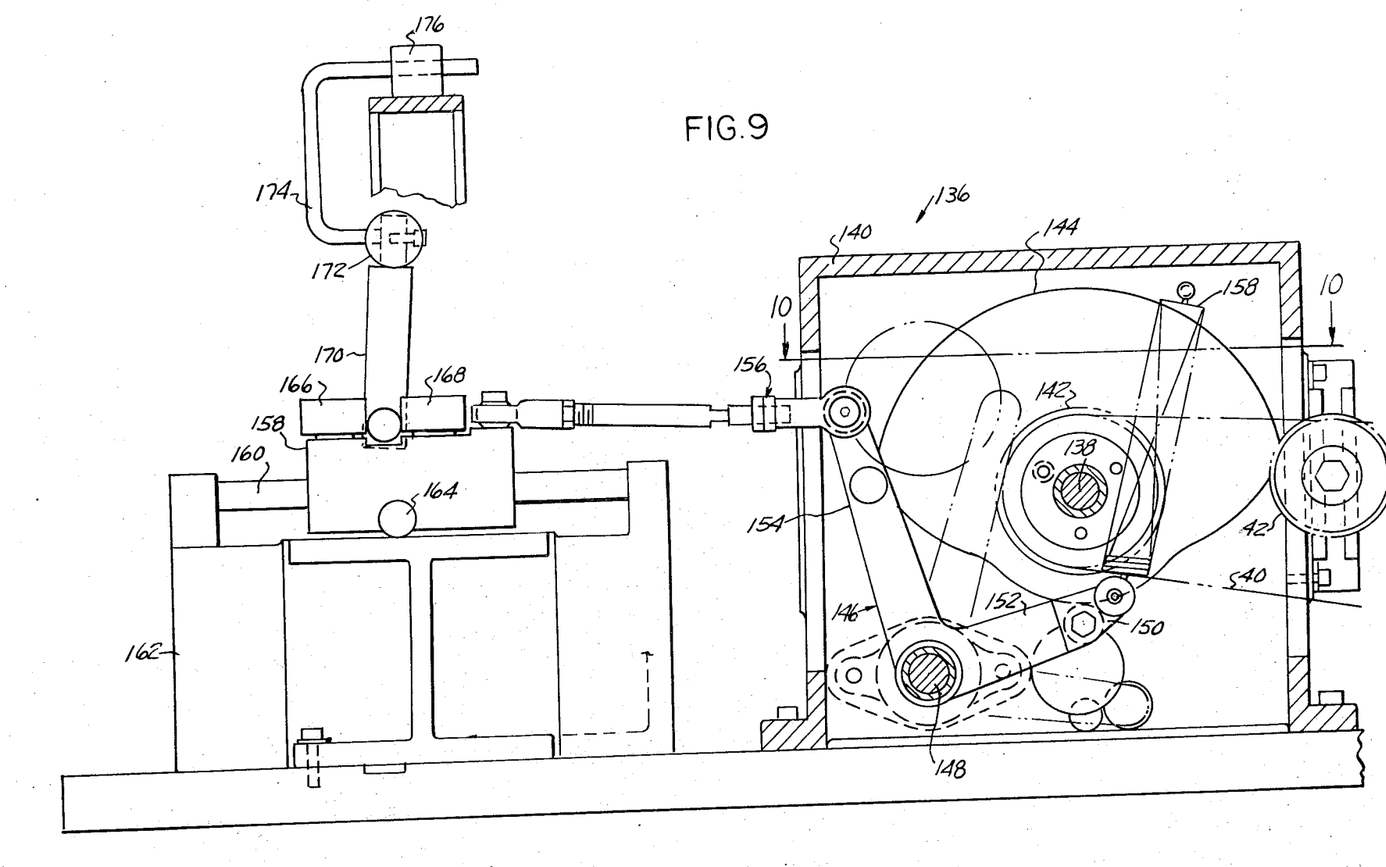
FIG. 9 is a transfer bar rotation mechanism according to the present invention.
Figure 10:
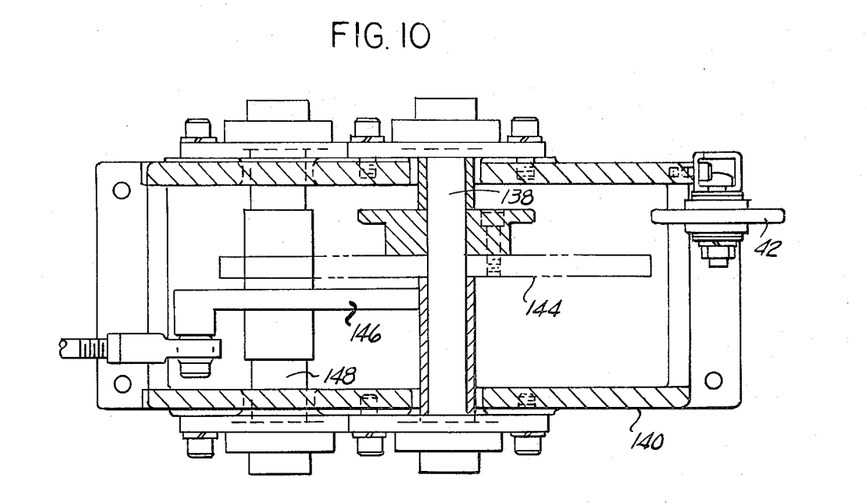
FIG. 10 is a view of the section taken along line 10—10 in FIG. 9.
Figure 11:
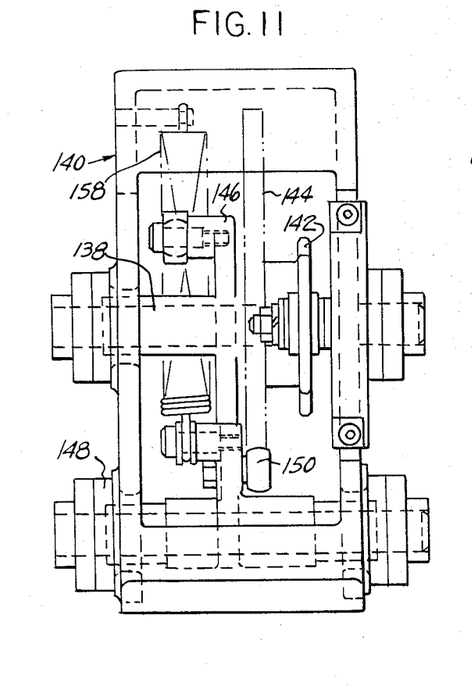
FIG. 11 is a rear elevational view of the turnover mechanism shown in FIG. 9.

Referring to FIGS. 9-11 a bar rotation motion mechanism 136 is shown, which is used to perform the oscillation of the transfer rods described above, and which includes a camshaft 138 rotatably supported in a housing 140. Camshaft 138 carries a sprocket 142, which is driven by the chain 40 and which in turn drives a rotary cam plate 144 affixed thereto.

A pivot lever 146 is also rotatably supported in housing 140 by a pivot shaft 148. Pivot lever 146 carries a cam follower 150 on one arm 152 which is engaged with the periphery of the rotary cam plate 144 and has attached to the other arm 154 an output rod 156.

A tension spring 158 connected to the pivot lever arm 152 and to the housing 140 biases the pivot lever counterclockwise as viewed in FIG. 9 to insure that the cam follower remains in contact with the rotary cam plate 144, so that rotation of the cam plate 144 causes reciprocation of the output rod 156.

The output rod 156 is connected to a slide block 158 which is slidingly mounted on rod 160 secured to a fixture 162 and also supported for sliding movement by rollers 164, so that slide block 158 is reciprocated by movement of the output rod 156.

Disposed between cam followers 166 and 168 fixed to slide block 158 is a U-shaped element 170 fixed to a transfer rod 172 having a series of gripping fingers 174 attached thereto as described above.

Accordingly, as the transfer rod is reciprocated it is at the same time oscillated to produce the advancement of the workpieces 176 as described above.

Thus, tooling positioning drive system thus allows a very few standardized versions of the motion mechanisms 44, 88, and 136 described to be manufactured and simply incorporated into the specific machine being constructed as modules.

It is noted that the rotary cam plates and pivot lever springs would be preferably designed and built as a standard series for each module since the movement of the various tooling arrangements does vary greatly with the application, and in addition for very specialized applications these elements could be rather easily fabricated on an individual basis by N. C. machining techniques and standard machine programs.

Figure 12:
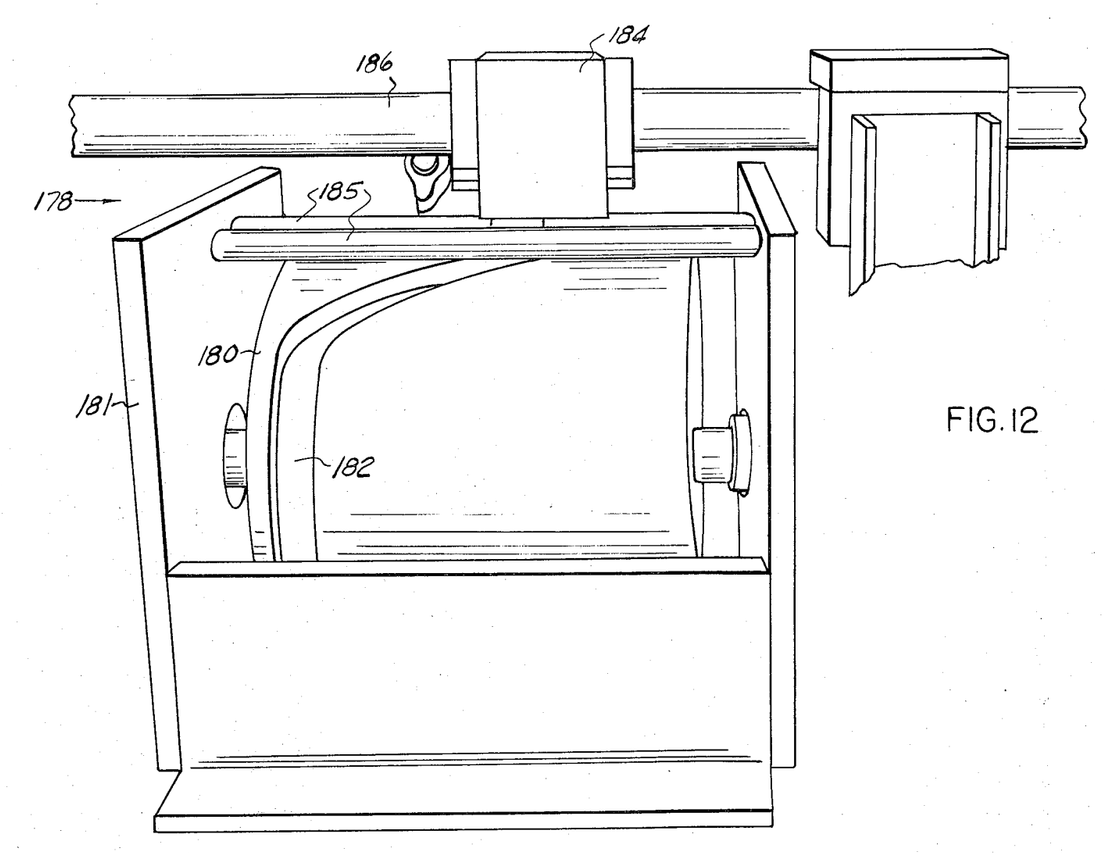
FIG. 12 is a perspective view of an axial cam type reciprocating mechanism for gaging machine workpiece transfer systems, suitable for being driven by the drive system according to the present invention.

Referring to FIG. 12, an axial cam 178 is shown for reciprocating the transfer rods which can be advantageously incorporated into gaging machines utilizing the drive system of the present invention and includes a drum member 180 rotatably supported in a housing 181 having groove 182 forumed in its surface. A cam follower member 184 is adapted to be reciprocated between guide rails 185 by a driving engagement with the groove 182, as the drum member 180 is rotated, preferably by means of a chain drive from the power take-off shaft 32 in a similar fashion to the motion mechanisms 44, 88, and 136. The cam follower 184 is connected to the transfer rod 186 to thus produce the desired reciprocation thereof.

Thus, a few standard axial cam modules corresponding to standardized transfer distances can be manufactured and incorporated into a great variety of automatic gaging and/or assembly machines as modules, since the driving connection allows great flexibility in its precise location.

Accordingly, it can be seen that the tooling positioning drive system disclosed allows for a great deal of modularization with respect to the tooling drives, with the attendant cost and time savings, by mating standardized motion mechanisms with the infinite variety of tooling encountered in designing and building linear transfer automatic machines.

What is claimed is:

1. A tooling positioning drive system for the tooling of a machine having a linear workpiece transfer system comprising:
    a power take-off shaft extending along said linear transfer system;
    drive means for rotating said power take-off shaft;
    a series of motion mechanism means disposed along said power take-off shaft and spaced therefrom, each of said motion mechanism means including a rotary cam means, an output tooling mounting member, and means drivingly connecting said output tooling mounting member in response to rotation of said rotary cam means;
    means mounting said tooling on said output mounting members for movement thereby;
    means drivingly connecting said power take-off shaft and each of said rotary cam means causing each of said rotary cam means to rotate in response to rotation of said power take-off shaft.

2. The drive system of claim 1 wherein said means drivingly connecting each of said rotary cam means and said power take-off shaft comprises a flexible drive element drivingly connecting each of said rotary cam means and said power take-off shaft.

3. The drive system of claim 1 wherein said means drivingly connecting said rotary cam means and said output tooling mounting member comprises a pivoted lever drivingly engaged with said rotary cam means and said output tooling mounting member.

4. The drive system of claim 3 further including means mounting said output tooling mounting member for sliding reciprocable movement in response to rotation of said rotary cam means.

5. The drive system of claim 4 wherein said means drivingly connecting said rotary cam means and said power take-off shaft comprises a flexible drive element drivingly connecting said rotary cam means and said power take-off shaft.

6. In an automatic machine of the type including a linear transfer system moving workpieces successively through a series of work stations whereat various locating, orienting, manipulation or gaging operations are carried out on said workpieces by means of tooling the improvement comprising:
    a tooling positioning drive system for the tooling of said automatic machine comprising:
    a power take-off shaft extending along said linear transfer system;
    drive means for rotating said power take-off shaft;

a series of motion mechanism means disposed along said power take-off shaft and spaced therefrom, each of said motion mechanism means including a rotary cam means, an output tooling mounting member, and means drivingly connecting said output tooling mounting member in response to rotation of said rotary cam means;

means mounting said tooling on said output mounting members for movement thereby;

means drivingly connecting said power take-off shaft and each of said rotary cam means causing each of said rotary cam means to rotate in response to rotation of said power take-off shaft.

7. The automatic machine of claim 6 wherein said means drivingly connecting said power take-off shaft and each of said rotary cam means and comprises a flexible drive element drivingly connecting said power take-off shaft and each of said rotary cam means.

8. The automatic machine of claim 6 wherein said means drivingly connecting said rotary cam means and said output tooling mounting member comprises a pivoted lever drivingly engaged with said rotary cam means and said output tooling member.

9. The automatic machine of claim 7 further including means mounting said output tooling mounting member for sliding translating movement in response to rotation of said rotary cam means.

10. The automatic machine of claim 6 wherein said means drivingly connecting said rotary cam means and said power take-off shaft comprises a flexible drive element drivingly connecting said rotary cam means and said power take-off shaft.

* * * * *